United States Patent
Szczepanik et al.

(10) Patent No.: US 10,831,411 B2
(45) Date of Patent: Nov. 10, 2020

(54) STORAGE CONTROLLER WITH OCS FOR MANAGING ACTIVE-PASSIVE BACKEND STORAGE ARRAYS

(71) Applicant: INTERNATIONAL BUSINESS MACHINES CORPORATION, Armonk, NY (US)

(72) Inventors: Grzegorz P. Szczepanik, Cracow (PL); Lukasz Jakub Palus, Cracow (PL); Kushal Patel, Pune (IN); Sarvesh Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 198 days.

(21) Appl. No.: 16/043,703

(22) Filed: Jul. 24, 2018

(65) Prior Publication Data

US 2020/0034043 A1    Jan. 30, 2020

(51) Int. Cl.
*G06F 11/00* (2006.01)
*G06F 3/06* (2006.01)
(Continued)

(52) U.S. Cl.
CPC ............ *G06F 3/067* (2013.01); *G06F 3/0604* (2013.01); *G06F 3/0619* (2013.01);
(Continued)

(58) Field of Classification Search
CPC ...... G06F 3/067; G06F 3/0619; G06F 3/0631; G06F 3/0604; G06F 3/0665; G06F 11/201; G06F 11/2023; G06F 11/2033
See application file for complete search history.

(56) References Cited

U.S. PATENT DOCUMENTS 9,128,622 B1    9/2015    Yang et al.
9,619,257 B1    4/2017    Aron et al.
(Continued)

OTHER PUBLICATIONS

Kitayama et al., "Torus-Topology Data Center Network Based on Optical Packet/Agile Circuit Switching With Intelligent Flow Management", https://www.osapublishing.org/jlt/abstract.cfm?uri=jlt-33-5-1063, Journal of Lightwave Technology vol. 33, Issue 5, pp. 1063-1071, 2015, 2 pages.

*Primary Examiner* — Philip Guyton
(74) *Attorney, Agent, or Firm* — Michael O'Keefe; Andrew D. Wright; Roberts, Calderon, Safran & Cole, P.C.

(57) ABSTRACT

A storage controller is provided with an optical circuit switch (OCS) for managing active-passive backend storage arrays. For this purpose a system includes a host computer system, a backend storage array having a first controller and a second controller, an optical circuit switch (OCS) connected between the host computer system and the first and second controllers, and a storage system controller comprising a failover detector to detect a failover of the first controller when the first controller is in an active state and the second controller is in a passive state, and an OCS controller to control the OCS to switch connection of the host computer system from the first controller to the second controller based on the failover detector detecting a failover of the first controller to place the second controller in an active state.

17 Claims, 5 Drawing Sheets

(51) Int. Cl.
  *H04B 10/079* (2013.01)
  *G06F 11/20* (2006.01)
(52) U.S. Cl.
  CPC .......... *G06F 3/0631* (2013.01); *G06F 3/0665* (2013.01); *G06F 3/0689* (2013.01); *G06F 11/201* (2013.01); *G06F 11/2033* (2013.01); *H04B 10/0793* (2013.01)

(56) References Cited

U.S. PATENT DOCUMENTS

| | | | |
|---|---|---|---|
| 9,824,027 B2 | 11/2017 | Flynn et al. | |
| 2003/0126315 A1* | 7/2003 | Tan | G06F 11/201 710/1 |
| 2014/0226975 A1 | 8/2014 | Zhang et al. | |
| 2017/0364307 A1 | 12/2017 | Lomelino et al. | |
| 2019/0042126 A1* | 2/2019 | Sen | G06F 3/0647 |

* cited by examiner

STORAGE CONTROLLER WITH OCS FOR MANAGING ACTIVE-PASSIVE BACKEND STORAGE ARRAYS

BACKGROUND

The present invention generally relates to managing active-passive backend storage arrays, and, more particularly, to controlling an optical switch circuit (OCS) by a storage system controller for managing connections to active-passive controllers of direct attached backend storage arrays.

Modern storage controllers provide a mechanism of direct node attachment in which storage controller nodes are connected to each other and/or to host computer systems by direct linking, without any switches. Currently, connection speeds up to 16G can be obtained with direct node attachment. In the direct attached connection, host nodes are connected in a direct attached mode in order to utilize high-bandwidth features of the direct attachment connections. One main purpose of supporting direct attachment is to reduce the switching costs when the storage virtualization and backend storage systems are integrated in an appliance. Direct node attachment also improves performance compared to switch fabric networks in that it reduces "HOPs," which is a portion of a signal journey from a source to a receiver. Direct attached connections are widely used in Flash Systems and SSD based storage arrays to achieve very high performance.

Direct attachment configurations allow storage administrators to provide more bandwidth for applications by using more I/O adapters, and benefit from high bandwidth workloads by using direct attachment. Direct attachment configurations are also simpler than fabric attached configurations, thereby reducing management overhead significantly. Further, the overall hardware requirement of setup of a direct attached configuration is reduced since no switches are required. Therefore, the overall costs associated with conventional switches used in fabric attached backend storage systems are reduced.

In conventional direct attached connection configurations a storage virtualization controller is provided with connected servers and underlying backend storage arrays. In such arrangements, the number of ports on each virtualization node of the virtualization controller is six, that is, two used for host attachment to the servers of the host computer system, two for clustering, and the remaining two for backend connection. In this implementation, if the backend storage system is an active-passive type, then a first controller will act as an active controller and respond to all I/O requests coming from the virtualization cluster. A second controller operates in a passive, or standby mode, and will be used in case the first controller fails.

SUMMARY

In a first aspect of the invention, there is a system which includes a host computer system, a backend storage array having a first controller and a second controller, an optical circuit switch (OCS) connected between the host computer system and the first and second controllers, and a storage system controller comprising a failover detector to detect a failover of the first controller when the first controller is in an active state and the second controller is in a passive state, and an OCS controller to control the OCS to switch connection of the host computer system from the first controller to the second controller based on the failover detector detecting a failover of the first controller to place the second controller in an active state.

In another aspect of the invention, there is a method including detecting, via a back end path detector, a failover of a first controller of a backend storage array connected to a host computer system, which first controller is in an active state; and performing a switching operation, via an optical circuit switch (OCS), based upon the detecting of the failover of the of the first controller, to connect a second controller of the backend storage array, which second controller is in a passive state, to change the second controller into an active state.

In another aspect of the invention, there is a computer program product comprising a computer readable storage medium having program instructions embodied therewith, the program instructions executable by a computing device to cause the computing device to: detect, via a back end path detector, a failover of a first controller of a backend storage array connected to a host computer system, which first controller is in an active state; and perform a switching operation, via an optical circuit switch (OCS), based upon the detecting of the failover of the of the first controller, to connect a second controller of the backend storage array, which second controller is in a passive state, to change the second controller into an active state.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
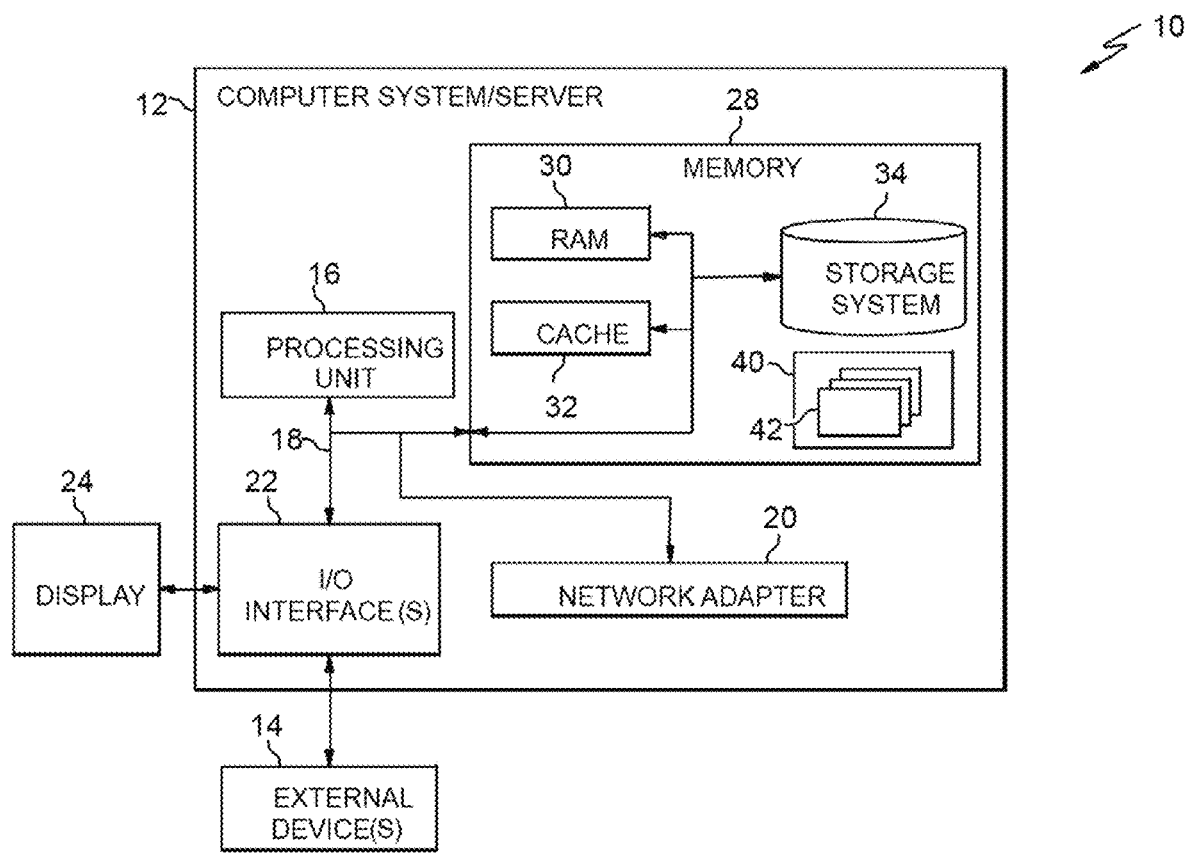
FIG. 1 depicts a computing infrastructure in accordance with aspects of the invention.

The present invention generally relates to managing active-passive backend storage arrays, and, more particularly, to controlling an optical switch circuit (OCS) by a storage system controller for managing connections to active-passive controllers of direct attached backend storage arrays. In conventional direct attachment systems, the direct attachment of the normally passive standby backend controller is required for the standby backend controller to be connected to a front end cluster port on each of the virtualization nodes of the virtualization node system. In particular, in conventional direct attachment systems, the passive standby controller of the backend storage array must continuously be connected to a separate port on the virtualization nodes other than the port that the first active controller of the backend storage system is connected to. This reduces scalability of the overall storage system due to the physical limitation of the number of ports in the virtualization node system.

In addition, conventional storage system architecture provides a CPU to physical port binding wherein the I/O from the physical port is processed by the statistically allocated CPU. Because of the underutilization of ports noted above, associated CPUs are also underutilize, resulting in wasting of resources. Also, costs of the storage solutions are based on the number of physical I/O ports. Conventional implementations of direct attachment storage systems require additional dedicated ports on the virtualization nodes for the passive standby controllers, which results in an inflation of the overall solution cost. Also, front-end multipath drivers need to be prompt enough to detect the path failure and divert I/O from other physical ports in case the primary active backend controller fails. This often leads to I/O failure and crashing of multi-pending drivers, which reduces application performance.

Aspects of the present invention include providing efficient access to direct attached storage systems by integrating OCS controls in storage virtualization controllers. This includes controlling OCS operations using the clustering system which keeps track of available backend controllers, backend controller status and failure effects, and identification of failed backend nodes. In accordance with aspects of the invention, switching of an OCS mirror provides substantially uninterrupted access to the backend disk subsystem. This also enables the clustering code to divert connections using OCS devices and make connection to an available online controller in the backend storage array in much less time than conventional direct attachment systems when a failure occurs in a primary I/O path.

In accordance with aspects of the present invention, an OCS generally has one input terminal and two output connectors. In embodiments, an OCS driver mechanism (or an API-based solution which signals the OCS driver at the time of an I/O direction switch) is incorporated in the storage system. The OCS is connected between the virtualization engine, comprised of virtualization nodes, and the backend active-passive storage array. The OCS takes commands from a driver implemented in a storage system controller so that the I/Os are diverted to a failover standby backend controller by the switching the connections in the OSC.

More particularly, at the time of an I/O direction switch, a driver in the storage system controller detects the new position of the active controller and updates the optical cross connected circuits mirror location to divert traffic to the backup standby controller. This makes all paths active after the I/O direction switch in the cluster of servers utilizing direct attached connections. Also, manual efforts to connect physical links are avoided as links are being moved using optical cross connect circuits. In other words, the links between the virtualization nodes and the backend storage system are made using optical fibers and optical signals, so the storage system is still a direct attachment system since no electrical physical switching is required.

In accordance with aspects of the invention, the mechanism deals with inbound or outbound APIs to integrate the OCS and the storage virtualization engine, and provides the capability in the storage virtualization engine to manage, monitor and operate the OCS apparatus. The backend failover is detected by the virtualization engine, and I/O paths are tuned accordingly by adjusting the OCS mirror directions. Since this mechanism uses the same I/O ports on the virtualization nodes before and after failover, the front-end multipathing driver utilizes the same path it previously utilized, and, hence, does not require additional operations for the path failure. Thus, better optimization is provided.

In accordance with aspects of the invention, the impact on storage solutions is significant since host systems connected to the storage system can provide better bandwidth for I/O operations. Applicability to storage clouds makes the present invention even more attractive since bandwidth is a major concern in the design of storage systems.

A number of advantages result from using the present invention. In the first place, as noted above, the requirement for an additional port on the virtualization nodes to configure a host attachment backend solution in direct-attached systems is avoided. This minimizes overall costs of the storage solution. Also, since a virtualization level multipathing driver utilizes the same path before and after a failover, no change in path information is required for the multipath driver, which saves additional computation for the multipath driver. Also, unwanted I/O timeouts and system crashes are avoided.

Further advantages are that a balanced CPU arrangement is provided since physical ports are bound to the CPU. This ensures proper CPU utilization. The present invention also provides high-bandwidth transmission paths in direct attachment systems between the storage controllers and host systems. In particular, the present invention can be used between storage nodes to obtain dedicated direct attachment connections with the nodes for clustering.

Further advantages of the present invention are power efficiency, since the OCSs do not convert information into electrical signals, and power consumption of an OCS is substantially lower than a comparable conventional electronic switch. The solution is also time efficient since the time required in conventional systems depends upon the storage administrator changing physical connections and then activating new paths. In accordance with aspects of the present invention, the clustering software is able to perform these operations automatically without requiring any manual intervention from a storage administrator. Thus, switching to a new controller in the backend storage system can be performed in milliseconds, as compared with at least a couple of hours required in conventional systems which require intervention of a storage administrator.

In addition, systems utilizing the present invention are speed efficient since the OCS does not convert information flowing over the optical fiber communication paths into electrical signals. It is noted that bandwidth of the OCS is essentially the same as bandwidth of the optical communication paths connected to the OCS.

In accordance with aspects of the invention, it is possible to connect backend storage arrays attached to a virtualization engine via inbound or outbound API mechanisms. It is also possible to send/receive commands to OCS circuitry to switch direction in case of a backend failover. For example, backend failure can be detected utilizing polling or interrupt-based methods, and it is then possible to notify the storage virtualization controller of the backend failure.

In accordance with further aspects of the invention, the OCS mirror is switched to a new active backend controller (i.e., the standby passive controller, serving as a failover controller) to continue I/O operations of the overall solution stack. The present invention also provides inbound and outbound APIs to integrate OCS controllers in the storage system. The present invention also permits configuring, maintaining and monitoring OCS data from the storage system, and tuning the direction of an optical mirror in the OCS when backend controller failure is detected. The mirror direction in the OCS can be moved back to its original position once the original primary active controller in the backend storage system is serviced. The mirror direction can also be moved back after a user triggers configuration changes.

In accordance with other aspects of the invention, the invention provides the ability to create data logs and metadata placement in the storage controllers based on data collection mechanisms implemented in the OCS. The invention also provides the ability to manage the direction switch of the OCS, as well as managing protocol data transfers based on direction changes. Further, the present invention permits implementing a solution using enhancements in existing protocols such as Small Computer System Interface (SCSI) or Non-Volatile Memory Express (NVMe), or to provide the ability to set a client-server based on out-of-bound implementations of OCS integrations, monitoring and usability.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure 10 is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
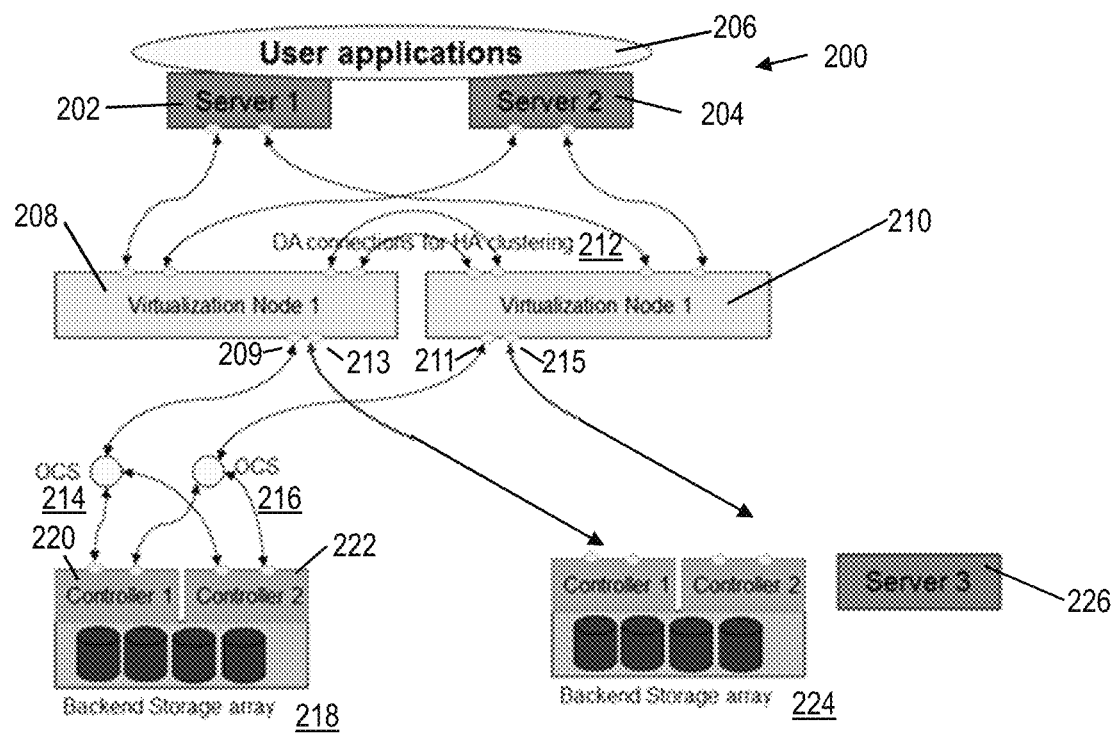
FIG. 2 shows a block diagram of an exemplary embodiment in accordance with aspects of the invention.

FIG. 2 shows a block diagram of an exemplary embodiment in accordance with aspects of the invention. In this embodiment, a host computer system 200 includes a first server 202 and a second server 204 for performing user applications 206. In alternative embodiments, additional servers are used. As shown in FIG. 2, connection ports on the servers 202 and 204 are connected to connection ports of a virtualization engine, or virtualization node system, comprised of a first virtualization node 208 and a second virtualization node 210. The virtualization node system, comprised of the first virtualization node 208 and the second virtualization node 210, operates to present a logical view of the backend storage array 218 to the host computer system 200, treating all storage media in the backend storage array 218 as a single pool of storage. In alternative embodiments, additional virtualization nodes are provided for the virtualization node system. Direct attachment connections 212 for host attachment clustering are also provided on each of the virtualization nodes 208 and 210 to connect these virtualization nodes to one another.

In embodiments, inputs of a first OCS 214 and a second OCS 216 are respectively coupled to I/O ports 209 and 211, respectively, of the virtualization nodes 208 and 210. The first OCS 214 and the second OCS 216 each have output terminals respectively coupled to a first controller 220 and a second controller 222 of a backend storage array 218. The first controller 220 and the second controller 222 respond to all I/O requests from the virtualization nodes 208 and 210. By virtue of utilizing the first OCS 214 and the second OCS 216, additional ports 213 and 215, respectively, on the virtualization nodes 208 and 210 are available to be connected, for example, to an additional backend storage array 224 or an additional server 226. This provides an important scalability advantage of the present invention over conventional direct attachment systems.

Figure 3:
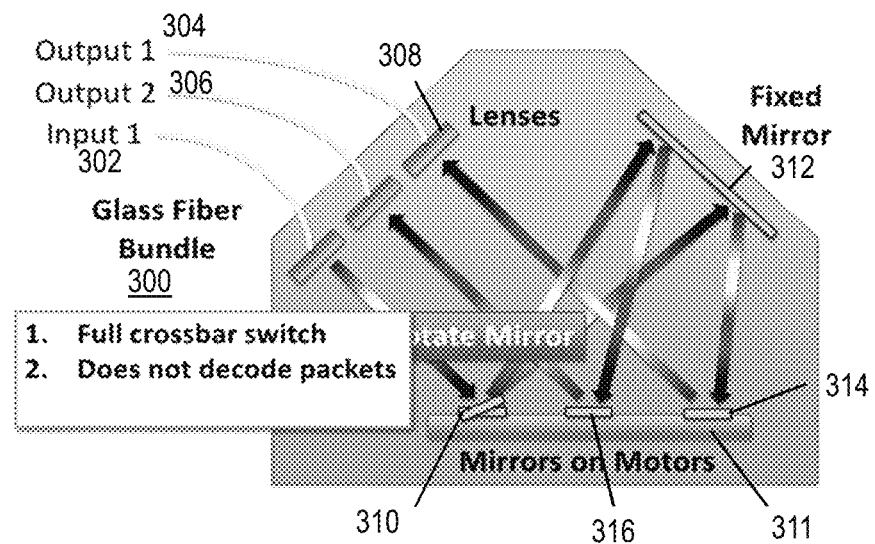
FIG. 3 shows an example of an optical circuit switch (OCS) which can be used in the embodiment shown in FIG. 2, in accordance with aspects of the invention.

FIG. 3 shows an embodiment of the first OCS 214 of FIG. 2. In embodiments, the second OCS 216 is also constructed in the manner shown in FIG. 3. As such, in the following description, the connections of the first OCS 214 of FIG. 3 are described, noting that the same connections are provided in this embodiment for the connection of the second OCS 216 to the virtualization node 210 and the controllers 220 and 222. It is noted that other conventional optical circuit switches could be used to provide the path switching described herein. In embodiments, OCSs 214 and 216 are implementations of external devices 14 shown in FIG. 1.

Referring to FIG. 3, a glass fiber bundle 300 is provided for the connections between I/O connection port 209 of the virtualization node 208 and the controllers 220 and 222 of the backend storage array 218. In other words, in embodiments, the connections between the virtualization nodes and the controllers using the OCSs 214 and 216 are optical connections utilizing the glass fiber bundle 300.

As shown in FIG. 3, an optical input signal on an input optical fiber 302 of the glass fiber bundle 300 is provided to a lens 308 of the OCS 214. Output optical fibers 304 and 306 are also connected to lenses 308 of the OCS 214. The optical input signal is provided by the input fiber 302 through a lens 308 to a movable mirror 310 mounted on (e.g., positionally controlled by) a motor 311. In normal operation, the input optical signal is passed by the movable mirror 310 to a point on a fixed mirror 312, and then to another movable mirror 314 mounted on the motor 311 so that an output optical signal is provided on the first output fiber 304. In embodiments, the output on the optical output fiber 304 is provided to the first controller 220 of the backend storage array 218 shown in FIG. 2. In alternative embodiments, the mirror 314 is a fixed mirror, with the necessary movement being provided by the movable mirror 310. In other alternative embodiments, the mirror 314 is a movable mirror, with the appropriate path being provided by adjustments of both of the mirrors 310 and 314.

When the OCS 214 receives an instruction to change the output path, as will be described hereinafter with regard to FIG. 4, the movable mirror 310 which receives the optical input signal on the input fiber 302 is moved by the motor 311 to change positions. As shown in FIG. 3, in the changed position, the optical signal from the movable mirror 310 is passed to a different location on the fixed mirror 312, and then to a different movable mirror 316 mounted on the motor 311. In this manner, the optical output signal of the OCS 214 is provided along the optical output fiber 306 rather than the optical output fiber 304. The optical output fiber 306 is connected to the second controller 222 of the backend storage array 218. As such, the OCS 214 can provide rapid switching of the I/O path from the virtualization node 208 to change the I/O path from the first controller 220 to the second controller 222 by movement of the movable mirror 310, particularly in the case of a failover condition of the first controller 220. In alternative embodiments, the mirror 316 is a fixed mirror, with the necessary movement being provided by the movable mirror 310. In other alternative embodiments, the mirror 316 is a movable mirror, with the appropriate path being provided by adjustments of both of the mirrors 310 and 314.

As noted in FIG. 3, the OCS 214 operates as a full crossbar switch, and does not decode optical packets. It is also noted that the OCS 214 utilizes a separate external scheduler, or an OCS controller API, as will be discussed hereinafter with regard to FIG. 4. It is also noted that the signal directions can be changed in the OCS 214 so that the fibers 304 and 306 operate as inputs for optical signals received from the controllers 220 and 222, respectively, and the fiber 302 becomes an output fiber for providing signals from the controllers 220 and 222, respectively, to the port 209 on the virtualization node 208. In this case, the movable mirror 310 is again controlled to determine whether the fiber 302 will receive optical signals from the fiber 304 or the fiber 306 (corresponding to receiving optical signals from the controller 220 or the controller 222).

Figure 4:
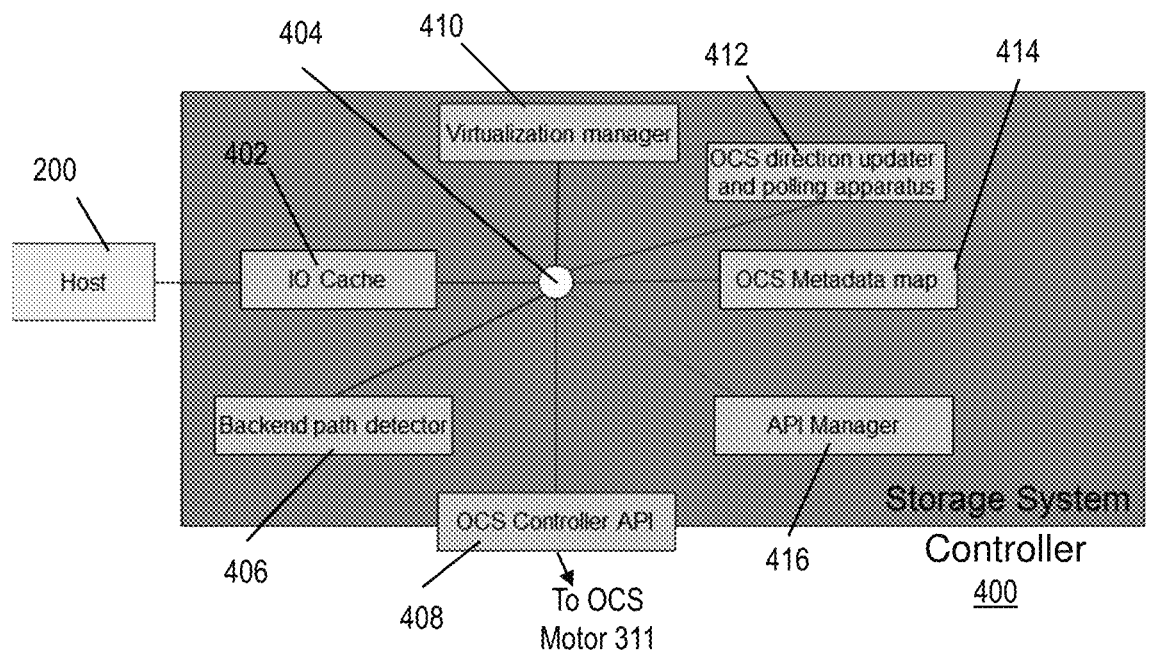
FIG. 4 shows a block diagram of an exemplary embodiment of a storage system controller which can be used in the embodiment shown in FIG. 2, in accordance with aspects of the invention

FIG. 4 shows a block diagram of a storage system controller 400 for controlling operations of the virtualization nodes 208 and 210, and the OCSs 214 and 216. As shown in FIG. 4, the storage system controller 400 is connected to the host computer system 200, as well as to the motors 311 of each of the OCS switches 214 and 216. In embodiments, the storage system controller 400 corresponds to one or more program modules 42 shown in FIG. 1 for controlling backend storage arrays 218 and 224 shown in FIG. 2, which are implementations of the storage system 34 shown in FIG. 1.

Continuing to refer to FIG. 4, the storage system controller 400 includes an I/O cache 402 connected to an interconnection node 404. The storage system controller 400 also includes a backend path detector 406, an OCS controller API 408, a virtualization manager 410, an OCS direction updater and polling apparatus 412, an OCS metadata map 414 and an API manager 416, all of which are also coupled to the interconnection node 404, to thereby be coupled to one another and to the virtualization nodes and the backend storage arrays shown in FIG. 2 to provide a storage system solution operation.

In embodiments, the I/O cache 402 receives input signals from the host computer system 200, and writes data (i.e., caches data) to subsequently store in the backend storage arrays 218 and 224, shown in FIG. 2. The I/O cache 402 also receives data from the backend storage arrays 218 and 224 and writes this data to subsequently be provided to the host computer system 200.

In embodiments, the backend path detector 406 detects failover in the backend storage system in a conventional manner utilized for direct attachment backend storage systems. In particular, the backend path detector 406 detects a failover of the normally active first controller 220 in the backend storage array 218 (as well as other normally active controllers of additional backend storage arrays 224, as shown in FIG. 2).

In embodiments, the OCS controller API 408 is connected to the OCS motor 311 of FIG. 3 in order to control the positioning of the movable mirror 310, as discussed above with regard to FIG. 3. In particular, as discussed above with regard to FIG. 3, in response to receiving a command from the OCS controller API 408, the motor 311 will change the position of the movable mirror 310 to determine whether the I/O path is between the port of the virtualization node 208 and the first controller 220 or the second controller 222. As discussed above with regard to FIGS. 2 and 3, changing the I/O path in this matter is performed in response to detection of a failover of the first controller 220, as determined by the backend path detector 406. The interconnection node 404 in the storage system controller 400 connects the backend path detector 406 and the OCS controller API 408 in order to permit the OCS controller API 408 to operate to control the movable mirror 310 in the OCS 214 to change the I/O path in response to a detection a failover of the first controller 220 by the backend path detector 406.

In embodiments, the virtualization manager 410 controls the operations of the virtualization nodes 208 and 210 for controlling clustering of the servers such as 202 and 204 of the host computer system 200. In particular, the virtualization manager 410 controls changing the clustering of the servers 202 and 204 of the host computer system 200 in appropriate circumstances, including when it is necessary due to failure of the normally active controller 220 of the backend storage array 218. The virtualization manager 410 is also connected to the interconnection node 404, as well as being connected to the virtualization nodes 208 and 210, for controlling the clustering of the servers 202 and 204 by control of the virtualization nodes 208 and 210.

In embodiments, the OCS direction updater and polling apparatus 412 monitors the direction of I/O signals in the embodiment shown in FIG. 2. In particular, the OCS direction updater and polling apparatus 412 is connected to the controllers 220 and 222 to determine if the normally passive standby controller 222 has taken over I/O responsibilities successfully in the event of a failover of the normally active controller 220. The OCS direction updater and polling apparatus 412 operates in conjunction with the OCS controller API 408, via the interconnection node 404, to initiate a command from the OCS controller API 408 to change the direction of the I/O flow to the new failover controller 222 upon determination by the backend path detector 406 that the normally active controller 220 has failed.

In embodiments, the OCS direction updater and polling apparatus 412 continues to monitor whether the I/O path has successfully changed to the new controller 222 by checking for I/O completions from the controller 222. Once the OCS controller 408 and the OCS direction updater and polling apparatus 412 confirm establishment of a successful I/O path utilizing the new controller 222, the OCS direction updater and polling apparatus 412 provides a signal to the virtualization manager 410 to determine clustering based upon the completion of the path change from the failed normally active controller 220 to the standby failover controller 222.

In embodiments, the OCS metadata map 416 of FIG. 4 operates to provide conventional metadata necessary for operating an OCS, such as the OCSs 214 and 216 shown in FIG. 2. The API manager 416 controls all APIs (i.e., Application Programming Interfaces) necessary for operation of the storage system controller 400, including the OSC controller API 408 in the manner described above, as well as with regard to the flowchart shown in FIG. 5, which will be described below.

Figure 5:
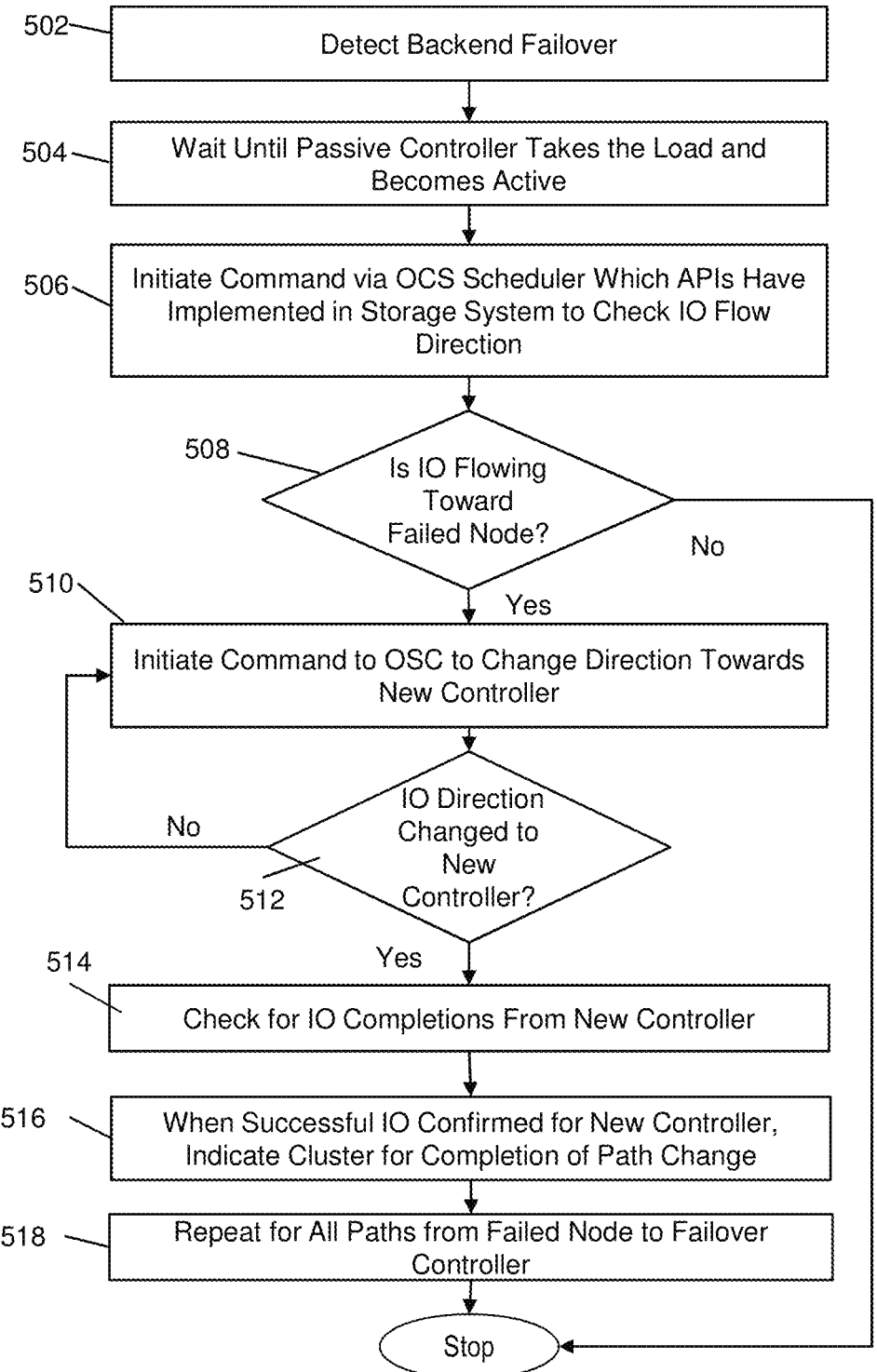
FIG. 5 shows a flowchart of an exemplary method in accordance with aspects of the invention.

FIG. 5 shows a flowchart of a method in accordance with aspects of the present invention, utilizing the exemplary embodiment shown in FIG. 2, as well as the OCS structure shown in FIG. 3 and the storage system controller 400 shown in FIG. 4. The steps of the method may be performed in the environment of FIGS. 2-4, and are described with reference to the elements and steps described with respect to FIGS. 2-4.

At step 502, the backend path detector 406 detects backend failover. More specifically, in embodiments, as described with respect to FIG. 4, the backend path detector 406, at step 502, detects failover in the backend storage systems 218 and 224 in a conventional manner utilized for direct attached backend storage systems. In particular, the backend path detector 406 detects a failover of the normally active controller, such as the first controller 220 in the backend storage array 218. In embodiments, the backend path detector 406, shown in FIG. 4, also detects a failover in the normally active controller of the backend storage array 224 shown in FIG. 2.

At step 504, the OCS direction updater and polling apparatus 412, allows a predetermined amount of time, following detection of backend failover by the backend path detector 406, for the normally passive standby controller 222 to take over the load and become an active failover controller, utilizing control of the OCSs 214 and 216, as described above with regard to FIGS. 2-4. In embodiments, the amount of time allowed for the normally passive controller 222 to take over the load and become active is set by the system administrator based on operational data regarding typical times determined for the I/O path change operation to take place.

At step 506, the OCS controller API 408 initiates a command to check the I/O flow direction. More specifically, in embodiments, as described with respect to FIG. 4, the OCS controller API 408 issues a command to the OCS direction updater and polling apparatus 412 of the storage system controller 400 to check the I/O flow direction after failover has been detected in step 502, and a predetermined period of time has passed for the normally passive controller 222 to become active, as described with regard to step 504. In particular, in embodiments, as described with respect to FIG. 4, the OCS direction updater and polling apparatus 412 is connected to the controllers 220 and 222 to determine if the normally passive standby controller 222 has taken over I/O responsibility successfully in the event of a failover of the normally active controller 220.

At step 508, the OCS direction updater and polling apparatus 412, upon receiving the command from the OCS controller API 408, determines whether the I/O signals are still improperly flowing to the failed node, that is, the failed controller 220, notwithstanding that the predetermined amount of time for the normally passive controller 222 to become active has elapsed. In particular, in embodiments, as described with respect to FIG. 4, the OCS direction updater and polling apparatus 412 is connected to the controllers 220 and 222 to determine if the normally passive standby controller 222 has taken over I/O responsibility successfully in the event of a failure of the normally active controller 220.

At step 508, if the OSC direction updater and polling apparatus 412 determines that the I/O signals are no longer flowing towards the failed controller 220, the control operation regarding the OCSs 214 and 216 and the virtualization nodes 208 and 210 is completed, and, accordingly, the process of changing the I/O direction from the original controller to the new controller is completed, as shown in FIG. 5. On the other hand, if it is determined by the OCS direction updater and polling apparatus 412 that the I/O signals continue to flow to the failed controller 220, the operation proceeds to step 510, as shown in FIG. 5.

At step 510, a command is initiated to the OCS to change directions towards the new controller, in this case, the normally passive standby controller 222. Specifically, in embodiments, as described with respect to FIG. 4, the OCS controller API 408 issues a new command to the appropriate OCS 214 or 216 to switch the I/O path from the respective virtualization node 208 or 210 to the normally passive controller 222.

At step 512, the OCS direction updater and polling apparatus 412 checks again to see if the I/O direction has changed to the proper new controller. In particular, in embodiments, as described with respect to FIG. 4, the OCS direction updater and polling apparatus 412 determines whether the I/O direction from the virtualization nodes 208 and 210 is to the new controller 222, operating in a backup capacity, to take over for the failed controller 220. If the determination is made in step 512 that the new controller 222 has not taken over operation, the method returns to step 510 where the OCS controller API 408 initiates another command to the OCS to change the direction towards the new controller by operation of the movable mirror 310 in the OCSs 214 and/or 216.

At step 514, if the determination is made at step 512 that the I/O direction has properly switched to the new controller 222, it is then determined whether I/O completions are being obtained utilizing the new controller. In embodiments, as described with respect to FIG. 4, the OCS direction updater and polling apparatus 412 checks the operations between the virtualization nodes 208 and 210 and the second controller 222 of the backend storage array 218 to ensure proper I/O completions between the backend storage array 218 and the virtualization nodes 208 and 210.

At step 516, when successful I/O's have been confirmed for the new controller, instructions are provided to indicate appropriate clustering for completion of the path change following detection of failover. In embodiments, has described with respect to FIG. 4, the virtualization manager 410 manages the virtualization nodes 208 and 210 to determine appropriate clustering of the servers 202 and 204 of the host computer system 200 to properly operate in light of the path change created by substituting the new controller 222 for the failed controller 220 of the backend storage array 218.

At step 518, the above steps 504-516 are repeated for all paths from a failed node to a failover controller once a backend failover has been detected in step 502. In embodiments, as described with respect to FIG. 4, the OCS controller API 408, the virtualization manager 410, and the OCS direction updater and polling apparatus 412 repeat the steps 504-516 for all paths from the failed node, i.e., the controller 220, to the new failover controller 222 to ensure successful I/O confirmation and proper clustering for all such paths.

In embodiments described above, it is envisioned that normally a physical set of a storage virtualization system revolving around the utilization and integration of OCS will be used to implement the invention, as described above. However, in an alternative embodiment, cloud computing utilizing a cloud platform can also be used for implementing the invention.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a host computer system;
   a backend storage array having a first controller and a second controller;
   an optical circuit switch (OCS) connected between the host computer system and the first controller and the second controller;
   a virtualization node system coupled between the host computer system and the OCS to connect the host computer system to the OCS, wherein the virtualization node system includes a first virtualization node and a second virtualization node, each including direct attachment connections to provide clustering of a plurality of servers of the host computer system; and
   a storage system controller comprising:
      a failover detector to detect a failover of the first controller when the first controller is in an active state and the second controller is in a passive state; and
      an OCS controller to control the OCS to switch connection of the host computer system from the first controller to the second controller based on the failover detector detecting a failover of the first controller to place the second controller in an active state.

2. The system of claim 1, wherein each server is coupled to the OCS through the virtualization node system.

3. The system of claim 1, wherein the direct attachment connections include connections on the first virtualization node to connect the first virtualization node to each of the plurality of servers and to the second virtualization node, and connections on the second virtualization node to connect the second virtualization node to each of the plurality of servers and to the first virtualization node.

4. The system of claim 3, wherein the OCS includes a first OCS and a second OCS, wherein the first OCS is coupled to a first port of the first virtualization network and to the first and second controllers, and the second OCS is coupled to a first port of the second virtualization node and to the first and second controllers.

5. The system of claim 4, wherein the first virtualization node and the second virtualization node each include an additional port to connect to at least one of the group consisting of: an additional back end storage array; and an additional server.

6. The system of claim 1, wherein the OCS comprises an input coupled to an I/O port of the virtualization node system, a first output coupled to the first controller and a second output coupled to the second controller, and a mirror structure to change connections of the input of the OCS from connecting to the first output to connecting to the second output, based on an instruction from the OCS controller.

7. The system of claim 6, wherein the mirror structure includes a fixed mirror and a movable mirror structure to operate in response to an instruction from the OCS controller to change the direction of an optical signal received at the input of the OCS from the first output of the OCS to the second output of the OCS.

8. The system of claim 1, wherein the storage system controller further comprises a virtualization manager to control operations of the first and second virtualization nodes to control clustering of the plurality of servers.

9. The system of claim 1, wherein the storage system controller further comprises an OCS direction updater and polling apparatus to verify that I/O signals from the host computer system have been switched to the second controller after the failover detector detects a failover of the first controller.

10. A method comprising:
    detecting, via a backend path detector, a failover of a first controller of a backend storage array connected to a host computer system, when the first controller is in an active state; and
    performing a switching operation, via an optical circuit switch (OCS), based upon the detecting of the failover of the of the first controller, to connect a second controller of the backend storage array to change the second controller from a passive state to an active state wherein the host computer system comprises a plurality of servers, each connected to the OCS via a virtualization node system coupled between the host computer system and the OCS.

11. The method of claim 10, further comprising determining whether an I/O flow between the host computer system and the first controller continues after failover of the first controller has been detected, and, based on determining that the I/O flow to the first controller continues, initiating a command to the OCS to change direction of the I/O flow to the second controller.

12. The method of claim 10, further comprising indicating a cluster of servers in the host computer system based upon confirming that the I/O flow has changed to the second controller.

13. The method of claim 10, wherein the virtualization node system includes a first virtualization node and a second virtualization node, each including direct attachment connections to provide clustering of the plurality of servers.

14. The method of claim 13, wherein the direct attachment connections include connections on the first virtualization node to connect the first virtualization node to each of the plurality of servers and to the second virtualization node, and connections on the second virtualization node to connect the second virtualization node to each of the plurality of servers and to the first virtualization node.

15. The method of claim 14, wherein the OCS includes a first OCS and a second OCS, wherein the first OCS is coupled to a first port of the first virtualization network and to the first and second controllers, and the second OCS is coupled to a first port of the second virtualization node and to the first and second controllers.

16. The method of claim 15, wherein the first virtualization node and the second virtualization node each include an additional port to connect to at least one of the group consisting of: an additional back end storage array; and an additional server.

17. A computer program product comprising a computer readable storage medium having program instructions embodied therewith, the program instructions executable by a computing device to cause the computing device to:
    detect, via a back end path detector, a failover of a first controller of a backend storage array connected to a host computer system, which first controller is in an active state;
    perform a switching operation, via an optical circuit switch (OCS), based upon the detecting of the failover of the of the first controller, to connect a second controller of the backend storage array, which second controller is in a passive state, to change the second controller into an active state; and
    determine whether an I/O flow between the host computer system and the first controller continues after failover of the first controller has been detected, and, based on determining that the I/O flow to the first controller continues, initiating a command to the OCS to change direction of the I/O flow to the second controller.

* * * * *